United States Patent [19]
Plummer

[11] Patent Number: 6,100,801
[45] Date of Patent: Aug. 8, 2000

[54] RADIO CONTROLLED LIGHT BAR

[75] Inventor: Robert D. Plummer, Union, Mo.

[73] Assignee: Custer Products Incorporated, North Canton, Ohio

[21] Appl. No.: 09/082,898

[22] Filed: May 21, 1998

[51] Int. Cl.[7] .............................. B60Q 1/26; B60Q 1/34
[52] U.S. Cl. ........................ 340/479; 340/431; 340/463; 340/475; 307/10.8; 362/61
[58] Field of Search .................................. 340/431, 479, 340/475, 463; 362/61; 307/10.8

[56] References Cited

U.S. PATENT DOCUMENTS

| | | | |
|---|---|---|---|
| 4,801,917 | 1/1989 | Winterfeld | 340/475 |
| 4,859,982 | 8/1989 | Seaburg | 340/475 |
| 4,891,625 | 1/1990 | VanRiper et al. | 340/479 |
| 5,198,798 | 3/1993 | Lietzow et al. | 340/539 |
| 5,353,008 | 10/1994 | Eikenberry et al. | 340/479 |
| 5,424,715 | 6/1995 | Lietzow et al. | 340/539 |
| 5,666,103 | 9/1997 | Davis, Jr. | 340/479 |

*Primary Examiner*—Daniel J. Wu
*Attorney, Agent, or Firm*—Sand & Sebolt

[57] ABSTRACT

A portable, radio controlled light bar magnetically affixable to a trailer or towed vehicle that receives signals from a transmitter magnetically affixable to the tow vehicle and electrically connected to its braking, turning and tail lighting systems. The light bar includes a pair of turn signals and a pair of tail/braking lights, each of which has a parabolic lens for magnifying the light emitted thereby requiring less light to provide sufficient brightness or lux. The transmitter includes a four prong receptacle that is readily connectable to a standard wiring harness on the tow vehicle. The radio frequency is adjustable so each unit has a unique radio frequency. The transmitter operates off of the voltage supplied by the tow vehicle while the light bar operates off of a rechargeable battery and the radio frequency signal received. A recharger is supplied on the light bar.

13 Claims, 5 Drawing Sheets

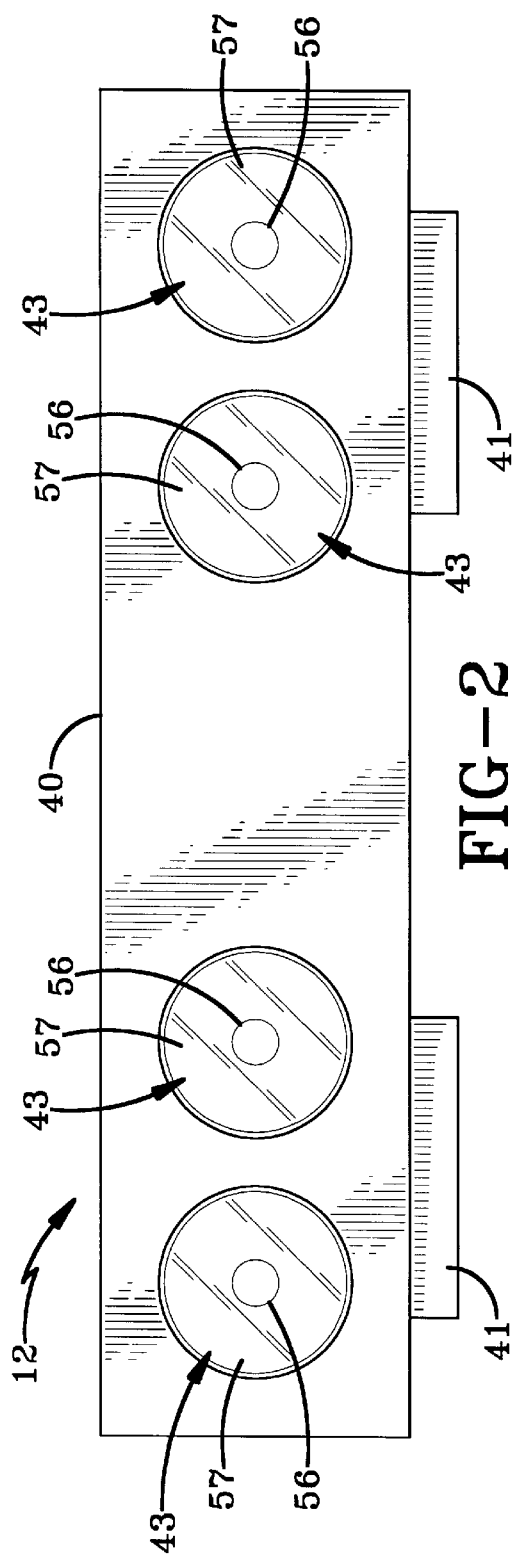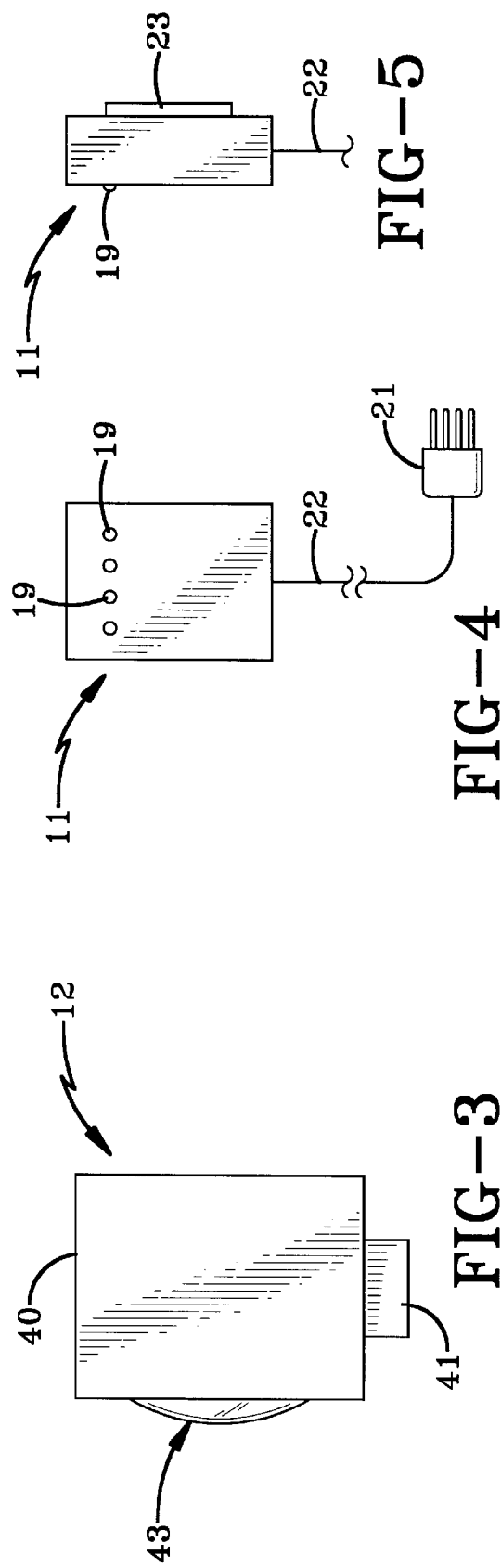

RADIO CONTROLLED LIGHT BAR

BACKGROUND OF THE INVENTION

1. Technical Field

The invention relates generally to lighting mechanisms as used on vehicles for lighting ahead of and behind the vehicle, and for indicating braking, turning and/or backing up of the vehicle. More particularly, the invention relates to lighting mechanisms which function as tail lights, brake lights, turn signals and/or backing lights as used on trailers, towed vehicles or other tow behind apparatus. Specifically, the invention is a portable, radio controlled light bar including various lighting features such as tail lights, brake lights, turn signals and/or backing lights and is affixable to a trailer or towed vehicle, and a radio wave transmitter box affixable to the tow vehicle and electrically connectable to the wiring system and specifically to the tail lights, brake lights, turn signals, and/or backing light electrical systems.

2. Background Information

As is well known in the art of vehicles such as cars and trucks, vehicles are pre-wired from the factory with tail lights, brake lights, turn signals and backing lights, all of which are generally required by local ordinances and state laws. Similarly, all trailers and other tow-behind apparatus that are used on any roadways must also have at least tail lights and brake lights, and often also turn signals although arm signals as used by the driver out the driver's window are generally sufficient during day light hours in some jurisdictions. For these reasons, substantially all vehicles and trailers are pre-wired and initially sold with all of the necessary lights thereon.

Many vehicles and trailers are not used on roadways at all or are principally used off road such as on the farm, construction sites or other off road area. However, occasionally these trailers must travel along roadways such as during moving of the farm trailer from farm to farm, or during moving of a construction trailer from job site to job site. In many instances and particularly with trailers used principally off road, these trailers are not sold with pre-wired lights. This is problematic when the trailers are to be towed on roadways as most if not all jurisdictions require at least certain minimum lights such as tail lights and brake lights.

As a result of this lack of lighting on many trailers, these trailers are either used illegally without lights, not driven on the roadways, or must have after market lighting systems installed. The towing of the trailer without lights is a dangerous event as significant property damage and personal injury may result from any mishap that may be caused due to lack of tail lights and/or brake lights including failure of another vehicle to see the trailer or see the trailer stopping. Such property damage and personal injury, particularly when resulting from a violation of the law, places the trailer owner and/or operator in a position of potentially high legal liability. The alternative of not driving the trailer on roadways is really not an option because generally it must be moved from site to site, and trailering of a trailer is a noneconomical way of moving the trailer.

The other alternative of "after market" wiring is generally the avenue chosen by such trailer owners. However, this is often expensive, time consuming, and sometimes rather difficult to install. Holes must often be drilled in the trailer and wires run underneath the trailer along the frame or body from the back of the trailer to the tongue. This option is also permanent in that each after market wiring system is permanently attached to that specific trailer, and for this reason an "after market" system must be purchased for every trailer.

Another towing area in which lighting is a problem is in the tow truck usage area where a broken down vehicle is being towed. The tow truck tail lights, brake lights, turn signals and backing lights are not attachable in any manner to the lights of the towed vehicle. For this reason, tow trucks often have oversized lights, overhead flashing lights, and even high or upwardly extended lights thereon to hopefully be visible around and particularly behind the vehicle in tow. Generally the only precautionary measure available to tow truck towed vehicles is flashing hazard lights. Although these lights are often bright and eye catching, the se lights do not adequately replace actual brake lights, tail lights, turn signals, and backing lights as the hazard lights merely flash.

A yet even further area where lighting is a problem is on cars towed behind motor homes and other campers. Generally, the cars have all of the necessary lights but these are not readily connectable to the motor home. The car must then be wired special for alternative use of the cars lights by the car when in use or the motor home when in tow. A similar situation is also often present when one moves its residence and must tow one of its cars behind a moving van. The only alternative at this time is to rent a tow trailer for use with the moving vehicle.

Obviously a lighting system is needed on all trailers that are used on roadways; however, many of these trailers are only infrequently used on roadways and thus a permanently installed system that is also often expensive and time consuming is not a preferred option. A lighting system is also needed for tow truck and tow vehicle combinations. Thus, a need exists for a lighting system that is temporarily affixable both mechanically and electrically to a trailer or towed vehicle while being readily removable for use on other trailers and towed vehicles. Specifically, a portable light assembly is needed that is interchangeable between multiple trailers and towed vehicles and thus more economical for use with seldomly road-towed trailers such as are used in the farming and construction industries, with broken down vehicles during towed transit, and with cars in tow behind motor vehicles. Additionally, the need requires such light assembly be lightweight, easy to attach and detach, easy to electrically connect, cost effective and simple to manufacture.

SUMMARY OF THE INVENTION

Objectives of the invention include providing a new and improved lighting system for use on trailers and towed vehicles.

Another objective is to provide such a new and improved lighting system in the form of a light bar which includes at least some of tail lights, brake lights, turn signals, and/or backing lights.

Still another objective is to provide such a new and improved lighting system that is portable and thus interchangeable from trailer and/or towed vehicle to trailer and/or towed vehicle.

A further objective is to provide such a new and improved lighting system that does not require any wires between the tow vehicle and the trailer or towed vehicle, nor any wires for the lighting system on the trailer or towed vehicle extending substantially from its frontmost end at a tongue or front bumper to its rearmost end.

Still a further objective is to provide such a new and improved lighting system that includes a transmitter on the tow vehicle and a receiver on the trailer or towed vehicle, the receiver including the at least some of the tail lights, brake lights, turn signals, and/or backing lights.

Still yet a further objective is to provide a new and improved lighting system on a trailer where the lights therein are radio controlled.

Still yet an even further objective is to provide a new and improved lighting system that includes a light bar that is readily removable yet securely attachable to the trailer or towed vehicle.

Yet another objective is to provide such a lighting system with some or all of these above attributes which requires no wiring, drilling, or other steps as are presently required to install a lighting system on a trailer, towed vehicle or the like.

Still yet another objective is to provide a lighting system that uses the tow vehicle electricity to transmit signals and the signals and a rechargeable battery to receive, process, and emanate new signals thereby not requiring expensive and time consuming power wiring to the towed vehicle or trailer.

An additional objective is to provide such a lighting system which is of simple construction, which achieves the stated objectives in a simple, effective and inexpensive manner, and which solves problems and satisfies needs existing in the art.

These and other objectives and advantages of the invention are obtained by the improved lighting system for use in connection with a trailer or towed vehicle that is towed behind a tow vehicle which has at least one electrical system including a light thereon for indicating one of tow vehicle braking or turning, or generally serving as tail lighting. The lighting mechanism including a tow vehicle or transmitter unit and a trailer/towed vehicle or receiver unit. The tow vehicle unit is removably attachable to the tow vehicle and includes a connector for electrical connection to the at least one electrical system of the tow vehicle and a signal transmitter electrically connected thereto for transmitting a signal indicative of the electrical signals passing through the at least one electrical system. The towed unit is removably attachable to the trailer or towed vehicle and includes a signal receiver for receiving the transmitted signal and at least one visual indicator electrically connected thereto for selective emanating a visual signal based upon the received signal.

BRIEF DESCRIPTION OF THE DRAWINGS

The preferred embodiments of the invention, illustrative of the best mode in which applicant has contemplated applying the principles, are set forth in the following description and are shown in the drawings and are particularly and distinctly pointed out and set forth in the appended claims.

FIG. 2 is an enlarged front elevational view of the transmitter portion of the present invention as shown in FIG. 1;

FIG. 3 is an enlarged side elevational view of the transmitter portion of FIG. 2;

FIG. 4 is an enlarged front elevational view of the receiver portion of the present invention as shown in FIG. 1;

FIG. 5 is an enlarged side elevational view of the receiver portion of FIG. 4;

Similar numerals refer to similar parts throughout the drawings.

DESCRIPTION OF THE PREFERRED EMBODIMENTS

Figure 1:
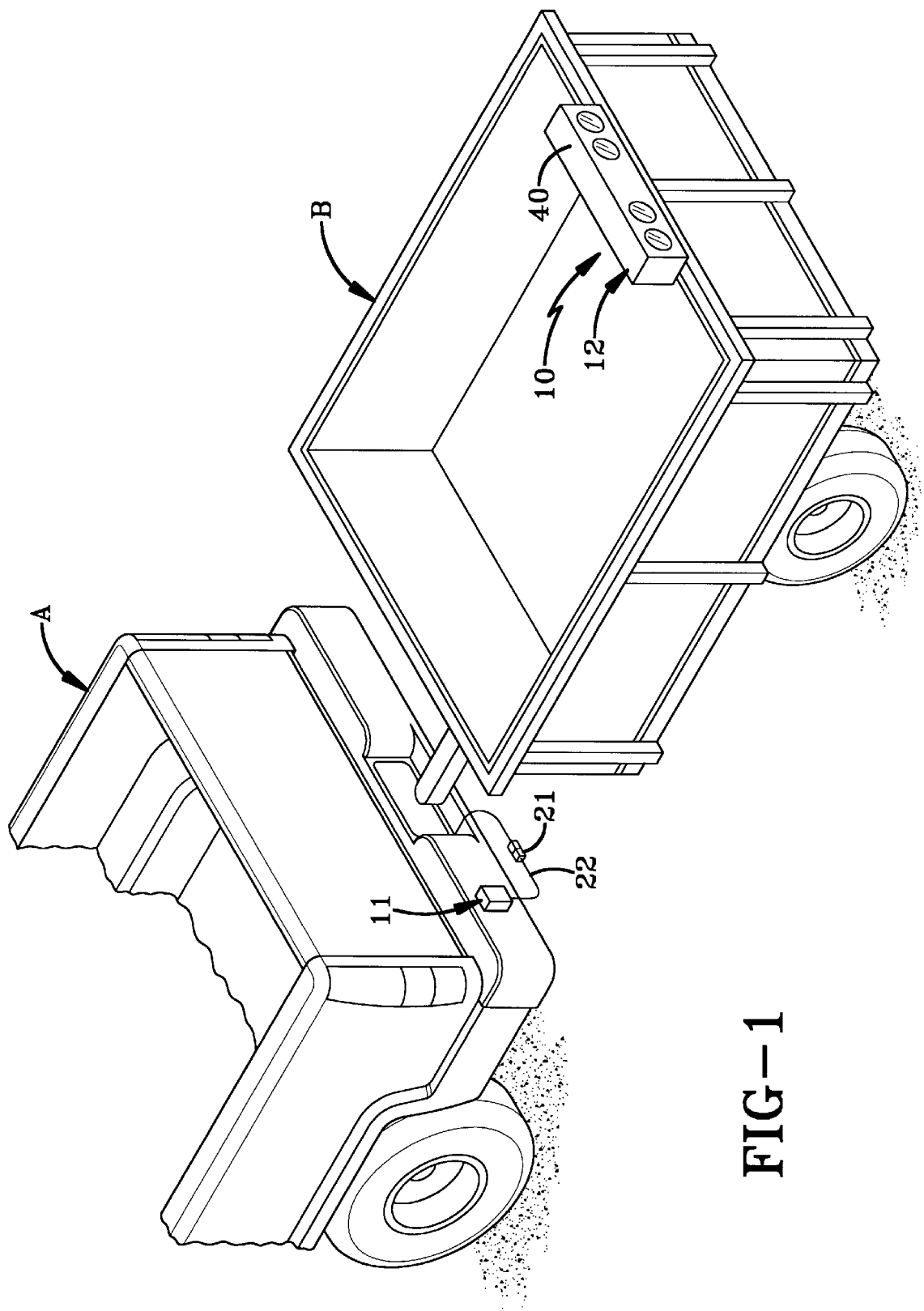
FIG. 1 is a perspective view of the present invention which includes a transmitter portion affixable to a tow vehicle and a receiver portion embodied as a light bar affixable to a trailer or towed vehicle.

The improved lighting mechanism of the present invention is a wireless and portable light bar 10 for use with a trailer or towed vehicle as best shown in FIG. 1. The light bar 10 includes two major units, namely a tow vehicle unit 11 and a separate trailer or towed vehicle unit 12. The tow vehicle unit 11 is removably affixable as described below to a tow vehicle A such as a car, truck, motor home, or tow truck. The trailer or towed vehicle unit 12 is similarly removably affixable as described below to a trailer B of any kind or a towed vehicle (not shown) of any kind such as a broken down vehicle towed by a tow truck or a car towed by a motor home.

The tow vehicle unit 11, as best shown in FIGS. 4 and 5, includes a body 20 with a receptacle 21 electrically connected thereto via wire 22, and at least one attachment device 23 used in conjunction therewith for removably securing the body 20 to the tow vehicle A. The body 20 as electrically described on the left portion of FIG. 6 includes an analog to rf converter 24, an oscillator such as a rf oscillator 25 which is tuned to the carrier frequency, a modulator 26 to impress the input signals onto the carrier frequency, and a transmitter 27. The body 20 may also include LED or other light indicators 19 as best shown in FIG. 4 so as to indicate to the user when specific signals are being sent. These LEDs 19 correspond or correlate with the light emanating elements 43 as described below.

The trailer or towed vehicle unit 12, as best shown in FIGS. 2–3, includes a body 40 with at least one attachment device 41 used in conjunction therewith for removable securing the body to trailer or towed vehicle B which is towed behind tow vehicle A. The body 40 includes at least one radio frequency wave receiver 42 (see FIG. 6) electrically connected to at least one light emanating element 43 (FIG. 2–3 and 6).

In the specific embodiment displayed in FIGS. 4–7, the tow vehicle unit 11 includes a slim or compact body 20 (FIG. 4) that has at least one magnet affixed thereto as its attachment device 23. This magnet is used to magnetically attach the body 20 to the tow vehicle A (FIG. 1), and more specifically to the metal bumper of the tow vehicle, if any, or the one of the rear metal body panels of the tow vehicle such as the trunk, rear hatch, or tail gate.

The receptacle 21 (FIG. 1 and 4) is electrically connected to the body 20 via the wire or other electrical conduit 22 so as to provide some freedom as to the location of the body 20 in relation to the required connection point of the receptacle 21 to the tow vehicle wiring. Specifically, receptacle 21 is any form of wire connecting device for electrically connecting the rf oscillator 25, modulator 26 and transmitter 27 to the electrical wiring of the tow vehicle, and specifically to at least one of the braking, backing (optional), turning signaling, or general tail lighting systems of the tow vehicle. It is well known in the trailer wiring art that male-female or other similar connectors and receptacles exist to perform this function and all such connectors and receptacles are incorporated by reference as receptacle 21.

Figure 6:
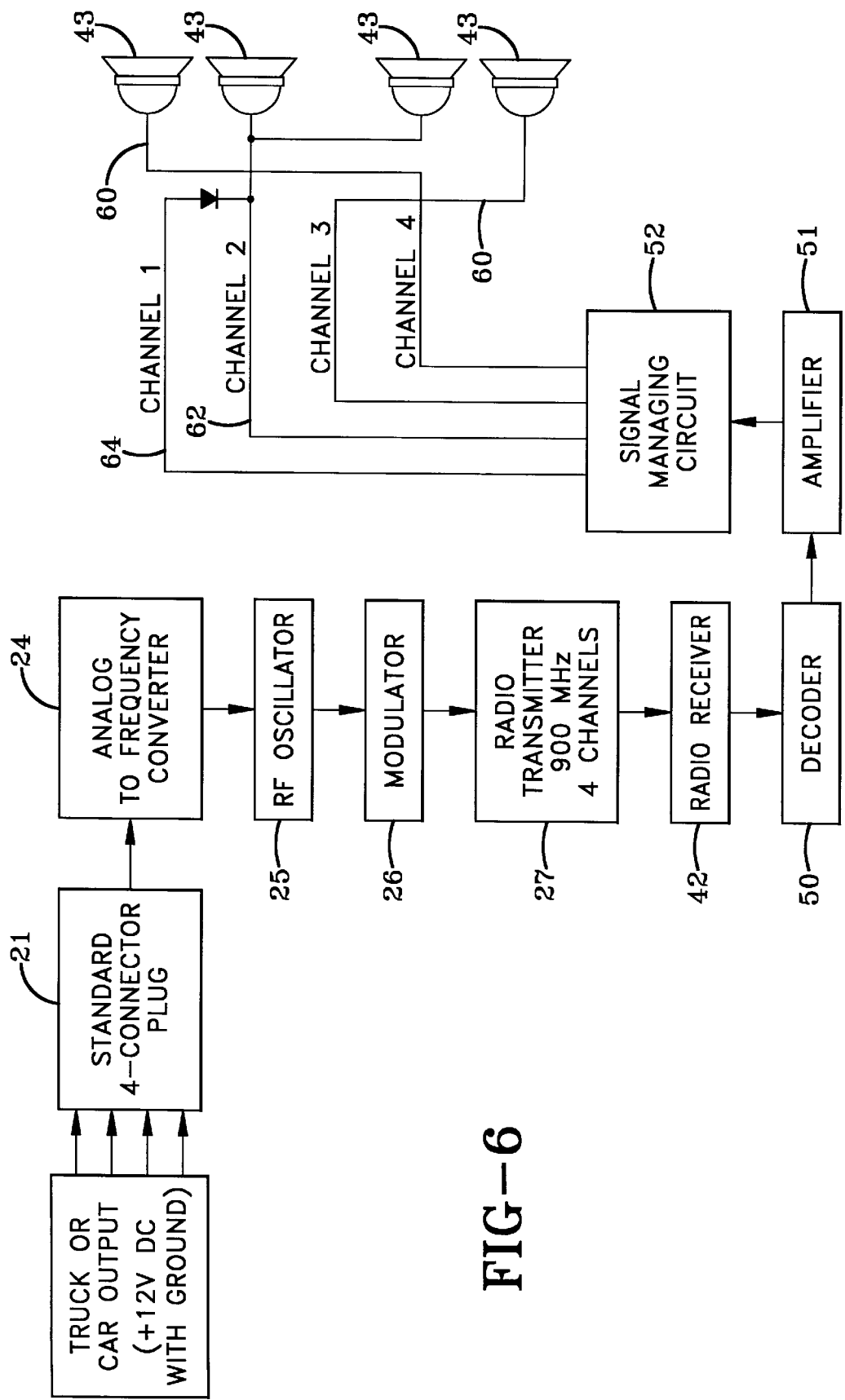
FIG. 6 is a block diagram showing the basics of the present invention.
Figure 7:
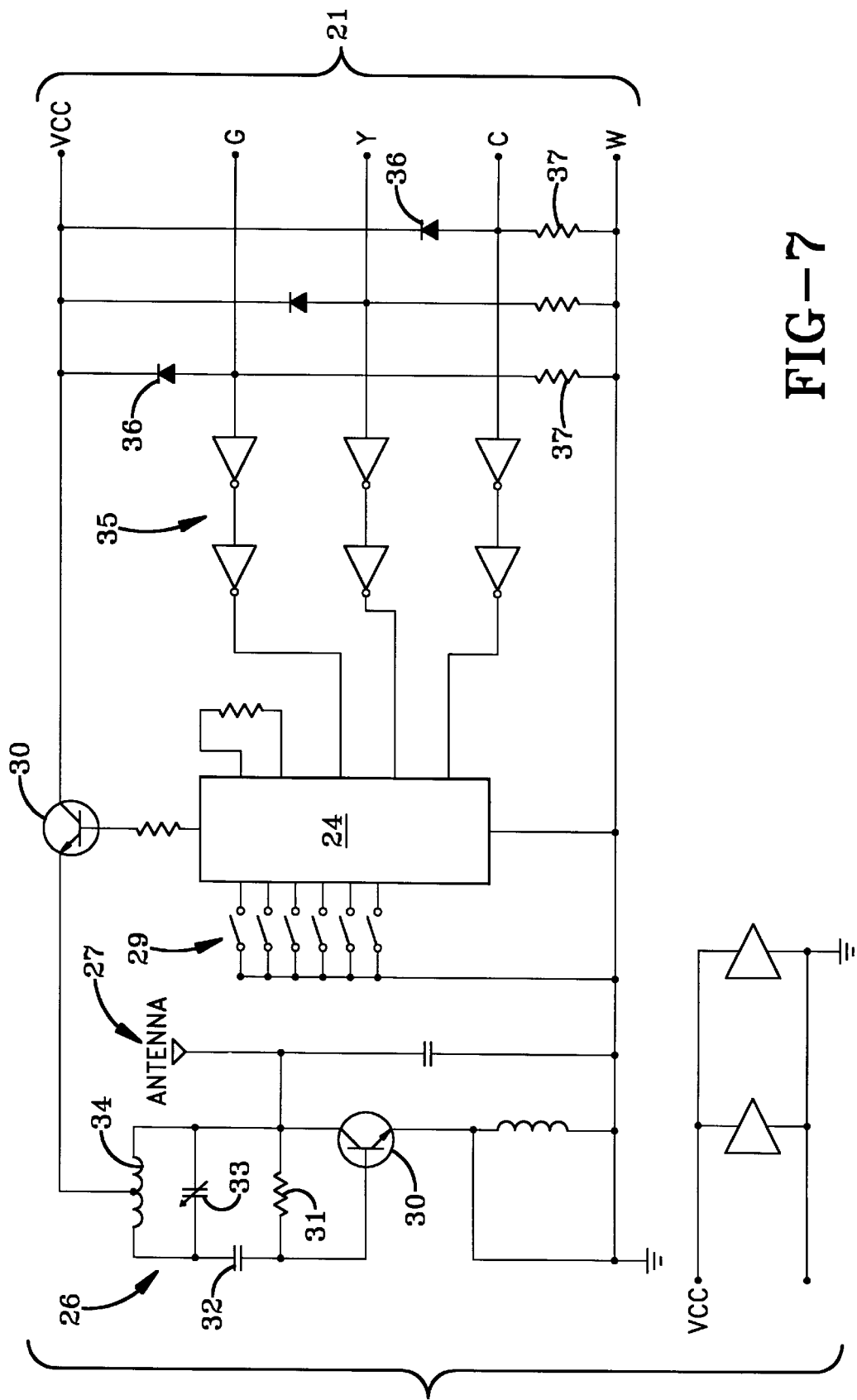
FIG. 7 is an electrical schematic of one embodiment of a transmitter portion of the present invention of FIGS. 1–3.

As best shown in FIGS. 6–7, the wire 22 via receptacle 21 delivers electrical signals to the converter 24 in the body 20 of the unit 11 whereby the signals are converted from analog to rf. Thereafter, the modulator 26 impresses the input signals onto the carrier frequency as provided by rf oscillator 25. Further, a microchip or other electrical circuit 28 may be provided prior to conversion and/or modulation to couple, correlate, sequence, join, pair, relate, or otherwise mesh two or more input signals so as to allow operation of one or multiple light emanating elements 43 using multiple input signals as is often necessary where one light functions in a dim mode as a tail light while in a brighter mode as a brake light (and/or in a brighter flashing mode as a turn signal). Further, a plurality of switches 29 may be provided for selectively controlling the input signals such as for instance allowing for the shutting off of a particular signal type and thus a particular activity such as backing lights. These switches 29 are generally grounded to perform this function.

Any number of devices and methods are available and well known for the conversion of analog input signals to radio frequency signals for transmission and all are hereby incorporated by reference. On such system is shown in FIG. 7. This converter 24 uses standard microchip technology such as SCR or SMPS technology, although this may be readily performed using standard electrical circuitry such as rectifier circuits.

Any number of devices and methods are available and well known for the modulation of the input signal or signals into a radio wave and all are hereby incorporated by reference. Such modulation may be by amplitude modulation, frequency modulation, or phase modulation. Digital modulation is also possible if vehicles should begin running using digital input signals or if a digital conversion is implemented. One such system is shown in FIG. 7. This modulator 26 is a circuit including one or more transistors 30 and in this case two npn bipolar transistors, and at least some of the following: resistors 31, capacitors 32, variable capacitors 33, and inductors 34.

The transmitter 27, which is embodied in FIGS. 6–7 as an antenna radiates or otherwise transmits the radio wave. The antenna in the displayed embodiment is shown as an elongated device although it may be of any shape, size or configuration as is well known in the art. Furthermore, the antenna may be either external of body 20 or internal within body 20 as is the case in the embodiment shown in FIGS. 1 and 4. The transmitter 27 may alternatively be any form of rf transmission device.

The unit 11 may additionally include one or more amplifiers, transistors or other known devices for amplifying the input signal and/or the rf signal prior to transmission thereof. The unit may further include various voltage sources, resistors, capacitors, inductors, gates, switches, convertors, transistors, amplifiers or other electronics as needed and well known in the art to more effectively transfer the tow vehicle braking, backing (optional), turn signal and tail light signals into a transmitted radio wave; many of which are shown in the displayed embodiment of FIG. 7 which is indicative of one of the many electrical systems possible to fulfill the transmitting functions of the present invention as performed by unit 11.

The unit 11 may further include various filters, fuses, etc. as are needed to more clearly operate this system. Such filters are shown in the embodiment of FIG. 7 as "NOT" gates 35 which are coupled in pairs whereby the first filter in each pair is primarily for filtering while a second filter is needed to invert back to signal which is inverted by the first filter during its filter process. Such fuses are shown in the embodiment of FIG. 7 as diode 36 and resistor 37 combinations. Other filter and fuse types as are well known in the art are contemplated and hereby incorporated by reference.

In the specific embodiment displayed in FIGS. 2–3, 6 and 8, the towed vehicle or trailer unit 12 includes the body 40 with the attachment device 41 used in conjunction therewith. The attachment device 41 is at least one magnet, in the FIGS. it is two, used to magnetically attach the body 40 to the trailer or towed vehicle B, and more specifically to the metal bumper of the trailer or towed vehicle, if any, or the one of the rear metal body panels of the trailer or towed vehicle such as the rear panel, trunk, rear hatch, or tail gate.

Figure 8:
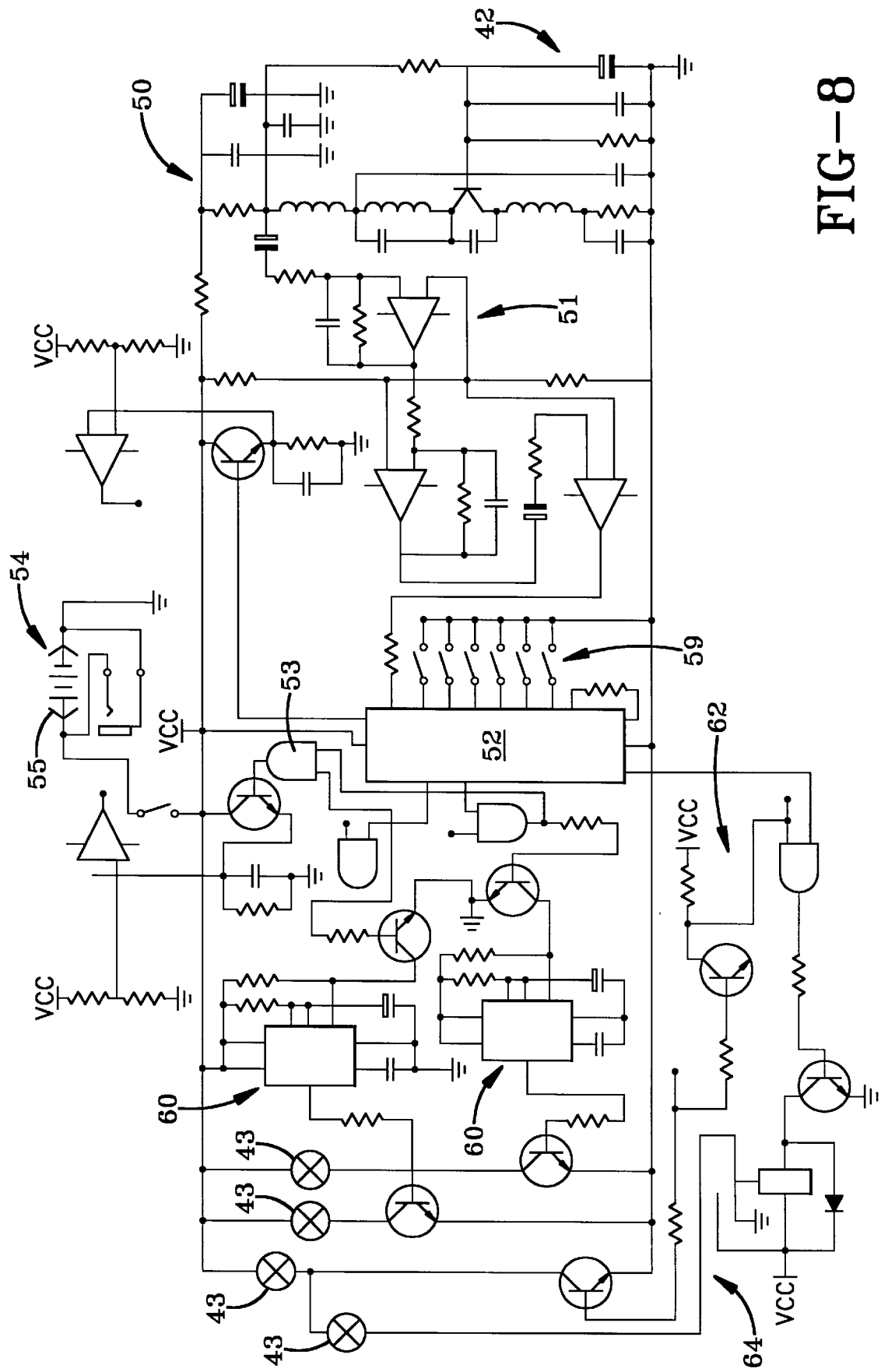
FIG. 8 is an electrical schematic of one embodiment of a receiver portion of the present invention of FIGS. 1, 4 and 5.

As described above, the body 40 includes at least one radio frequency wave receiver 42 electrically connected to at least one light emanating element 43. In the embodiment of FIGS. 6 and 8, the body 40 includes only one radio frequency receiver 42 which is capable of decoding the signal, although alternatively multiple receivers could be used where each is frequency dependent and directly connected to a respective light emanating element (alternatively through any necessary or desired amplifiers, transistors, etc.). The receiver(s) 42 may be any known type of radio frequency receiving unit such as an antenna or any other rf receiving component or system. As shown in FIG. 8, the receiver 42 of the specific embodiment displayed is an rf receiving system comprising various capacitive and resistive elements.

In the specific embodiment displayed in FIGS. 6 and 8 where only one receiver is used, the body 40 also includes a decoder or decoder circuit 50, an amplifier or amplifier circuit 51, a microchip or other electrical circuit 52 for managing and combining the various decoded signals so as to allow one or more of the light emanating elements 34 to perform various lighting tasks as described below in more detail, various "AND" gates 53 to assure only proper decoded signals activate light emanating elements, a battery recharging circuit 54 with a battery 55 therein, several circuits for creating the necessary electrical current for at least one of, and preferably all four of, brake indication, tail lights, backing indication, and turning indication, and the at least one light emanating element 43 which in this embodiment is multiple light bulbs 56 with light permeable covers 57 in various colors. The covers 57 may include various light refracting, disbursing, or coloring lenses such as parabolic lenses which allow for the use of smaller light emanating elements and lesser voltages but still supply sufficient lux or brightness.

The several circuits are specifically a pair of turn signal circuits 60 which include microchips 61 for creating the flash or pulsating light emanation necessary to indicate turning, a tail light circuit 62, a backing light circuit (not shown), and a braking light circuit 64. In this embodiment, several of these circuits are coupled together thereby eliminating redundancies in circuitry as well as minimizing the number of lights needed. For instance, the light bulb which glows as a tail light may be operated at a first power or lumen which is increased in intensity to a second power or lumen to signify braking. Alternatively, the same light bulb which glows as a tail light may be operated at a second power or lumen which is increased in intensity to a second power or lumen in an intermittent fashion so as to blink or flash from the first lumen rate to the second lumen rate to signify turning. In a similar manner, braking and turning may share a light bulb. Additionally, the same light bulb may be used to accomplish tail lighting, turn signal indicating and brake indicating by combining these features through a common microchip. Backing lights are also optionally contemplated by this invention (but not shown in the electrical schematic of FIGS. 7 and 8) but would generally not be coupled with the above although such a concept is clearly within the scope of this invention.

Preferably, the overall system will closely mimic a standard vehicle lighting system whereby tail lights are coupled together with brake lights as is clearly shown in FIG. 6 (although sometimes the brake lights are separate or an additional set of brake only lights is also provided), and the turn signals (and optional backing lights if added) are separate systems since tail and brake lights often use red lenses while turn signals use orange or yellow lenses and backing lights use white lenses. In any case, it is contemplated that circuits 60, 62 and 64 may be stand alone circuits or may be coupled together in any groupings so as to effectively indicate any or all of braking, backing, and turning while also providing general tail lighting as needed or desired.

The decoder or decoder circuit 50 is necessary where only one receiver is used since the signal or signals received must be demodulated from the rf oscillating frequency and then decoded into different signals relating to the various inputted signals, namely braking, backing, turning, and tail lighting signals. Numerous types of decoders and decoding circuits are available and hereby incorporated by reference whereby one type is shown in FIG. 8.

The amplifier or amplifier circuit 51 is often used to either or both amplify a weak signal and/or in conjunction with the decoding and demodulating steps as is well known in the art. At some point in conjunction with the decoding, demodulating, or amplifying, the signal is converted back to analog by a rf to analog converter 58.

The microchip or other electrical circuit 52 for managing and combining the various decoded signals so as to allow one or more of the light emanating elements 34 to perform various lighting tasks as described above is a microchip that combines or correlates signals such that multiple signals may follow the same circuit resulting in differing outputs (lumen rates or flashing versus continuous lighting). Further, a plurality of switches 59 may be provided for selectively controlling the input signals into the chip such as for instance allowing for the shutting off of a particular signal type and thus a particular activity such as backing lights. These switches 59 are generally grounded to perform this function.

The battery recharging circuit 54 with a battery 55 therein is used to supply sufficient voltage to illuminate the lights so that each emanates the necessary lumens or lux. Various parabolic lenses 57 are optimally used to minimize the need for voltage but some battery source is preferred to assure sufficient lumens or lux at the light bulbs during operation. The battery 55 provides additional current above and beyond the analog signal resulting from the rf signal as is needed. The recharging circuit 54 merely uses unneeded rf signals to charge the battery 55 as available.

Additional elements of the system include a selectable frequency selector on the transmitter with a correlated frequency tuner on the receiver so that each light bar 10 may have its own unique frequency. This prevents accidental or unintended activity of the lights on the receiver as a result of an inadvertent signal from an other light bar.

In sum, the invention is a portable, light weight device comprising the two components of a tow vehicle unit or transmitter portion 11, and a trailer or towed vehicle unit or receiver portion 12. Each unit is magnetically or similarly affixable in a removable manner to its respective tow vehicle, or trailer/towed vehicle. The transmitter unit 11 is electrically attachable to the standard wiring harness of a tow vehicle or alternatively directly into its braking, lighting, backing and/or turning electrical systems. The transmitter unit 11 takes the analog signals from these electrical systems and converts it to radio frequency signals for transmission. This is accomplished via one transmitter which either or both is capable of sending multiple signal types on its oscillating frequency or couples various signals to its oscillating frequency. Alternatively multiple simple transmitters may be used that solely transmit simple signals each at its own frequency and correlating to one of the braking, backing, turning or lighting actions.

The receiver unit 12 then correspondingly has one receiver system capable of receiving the various signals at its oscillating frequency or coupled various signals at its oscillating frequency whereafter it decodes, demodulates, and converts the signals back to analog. Alternatively and correlating to the transmitting alternative, multiple simple receivers may be used, each for receiving a different frequency signal only which correlates only to one of the above mentioned actions. After the signals are properly amplified, filtered, etc., and the turning signals are processed by the a flash microchip, then various lights are illuminated per the signals sent and processed by the system.

As a result on the displayed embodiment of FIGS. 1–8, a pair of red lights and a pair of yellow lights are provided. The red lights function as tail lights which burn continuously when on while also illuminating more brightly during braking to serve a brake indicating function. Separately, the yellow lights serve as left and right turn signals whereby each flashes or blinks when so activated.

The invention is portable from one tow vehicle to another. Similarly, it is portable from one trailer or towed vehicle to another. No "on site" wiring of the trailer or towed vehicle is necessary; and the only wiring necessary on the tow vehicle is a standard wiring harness. For farm machinery and other off road equipment and trailers, this allows for towing on road when no such lights exist without complex, difficult and expensive wiring of the machinery, equipment, or trailer. For broken down vehicles, it allows for added safety of having lights on its rearmost point rather than relying on the tow vehicles lights which are often not visible. Finally, it allows motor homes to easily tow any desired vehicle without the above described wiring constraints and obstacles.

Accordingly, the improved trailer or towed vehicle lighting system is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved trailer or towed vehicle lighting system is constructed and used, the characteristics of the construction, and the advantageous, new and useful results obtained; the new and useful structures, devices, elements, arrangements, parts and combinations, are set forth in the appended claims.

What is claimed is:

1. A lighting mechanism for use in connection with a trailer or towed vehicle that is towed behind a tow vehicle which has at least one electrical system including a light thereon for indicating one of tow vehicle braking or turning, or generally serving as tail lighting, the lighting mechanism comprising:

a tow vehicle unit removably attachable to the tow vehicle and including a connector for electrical connection to the at least one electrical system of the tow vehicle and a signal transmitter electrically connected thereto for transmitting a signal indicative of the electrical signals passing through the at least one electrical system;

a towed unit removably attachable to the trailer or towed vehicle and including a signal receiver for receiving the transmitted signal and at least one visual indicator electrically connected thereto for selective emanating a visual signal based upon the received signals;

the signal transmitter being a four channel transmitter, and the signal receiver being a four channel receiver that includes a first channel for brake indicating, a second channel for tail light indicating, a third channel for left turning indicating, and a fourth channel for right turn indicating; and the channels being connected with the at least one visual indicator that includes a plurality of light bulbs electrically connected so as to indicate tail lighting by illuminating at least one of the light bulbs to a first visually noticeable level, to indicate braking by illuminating at least one of the light bulbs to a second visually noticeable level different from any other visually noticeable level that particular light bulb is illuminated to, to indicate left turning by illuminating at least one of the light bulbs on the left side of the towed unit to a third visually noticeable level different from any other visually noticeable level that particular light bulb is illuminated to, and to indicate right turning by illuminating at least one of the light bulbs on the left side of the towed unit to a fourth visually noticeable level different from any other visually noticeable level that particular light bulb is illuminated to.

2. The lighting mechanism of claim 1 wherein the tow vehicle unit further includes a rf oscillator and a modulator electrically connected thereto for coupling an oscillating frequency to the signal indicative of the electrical signals passing through the at least one electrical system.

3. The lighting mechanism of claim 1 wherein the tow vehicle unit further includes an analog to rf converter electrically connected thereto.

4. The lighting mechanism of claim 1 wherein the towed unit further includes a demodulator electrically connected thereto for decoupling an oscillating frequency from the received signal.

5. The lighting mechanism of claim 1 wherein the towed unit further includes a decoder electrically connected thereto for decoding the received signal and providing light directing signals.

6. The lighting mechanism of claim 1 wherein the towed unit further includes a rechargeable battery and a battery recharging system electrically coupled thereto.

7. The lighting mechanism of claim 1 wherein each of the tow unit and the towed unit includes magnets for removably attaching the units to the tow vehicle and towed vehicle respectively.

8. The lighting mechanism of claim 1 wherein the visual indicator is a light bulb and a parabolic lens is provided over the light bulb for magnifying any light emanated therefrom.

9. A lighting mechanism for use in connection with a trailer or towed vehicle that is towed behind a tow vehicle which has at least one electrical system including a light thereon for indicating one of tow vehicle braking or turning, or generally serving as tail lighting, the lighting mechanism comprising:

a tow vehicle unit removably attachable to the tow vehicle and including a connector for electrical connection to the at least one electrical system of the tow vehicle and a signal transmitter electrically connected thereto for transmitting a signal indicative of the electrical signals passing through the at least one electrical system;

a towed unit removably attachable to the trailer or towed vehicle and including a signal receiver for receiving the transmitted signal and at least one visual indicator electrically connected thereto for selective emanating a visual signal based upon the received signal;

the tow vehicle unit further including a rf oscillator and a modulator electrically connected thereto for coupling an oscillating frequency to the signal indicative of the electrical signals passing through the at least one electrical system; and a control for adjusting the oscillating frequency of the transmission.

10. A lighting mechanism for use in connection with a trailer or towed vehicle that is towed behind a tow vehicle which has a braking electrical system indicative of tow vehicle braking, a turning electrical system indicative of tow vehicle turning, and a tail light electrical system for providing tail lighting where each system includes a light therein for indicating braking or turning, or generally serving as tail lighting, respectively, the lighting mechanism comprising:

a transmission unit magnetically attachable to the tow vehicle and including a connector for electrical connection to the tow vehicle electrical systems via a multiple prong adaptor and a signal transmitter for transmitting a signal indicative of the electrical signals passing through the electrical systems;

a receiver unit magnetically attachable to the trailer or towed vehicle and including a signal receiver for receiving the transmitted signal, a signal processor electrically connected thereto for processing the signal into light directing signals, and a plurality of lights electrically connected thereto for selective emanating of a visual signal indicative of at least one of tail lighting, brake lighting or turn signaling based upon the light directing signals;

the transmission unit further including a rf oscillator electrically connected thereto, a modulator electrically connected thereto for coupling an oscillating frequency to the signal indicative of the electrical signals passing through the at least one electrical system, and an analog to rf converter electrically connected thereto; and a control being provided for adjusting the oscillating frequency of the transmission.

11. The lighting mechanism of claim 10 wherein the signal processor includes a demodulator electrically connected thereto for decoupling an oscillating frequency from the received signal, an rf to analog converter, and a decoder electrically connected thereto for decoding the received signal and providing light directing signals.

12. The lighting mechanism of claim 11 wherein the receiver unit further includes a plurality of lighting circuits electrically connected to at least a receiver tail and brake light and a pair of receiver turn signal lights whereby the lighting circuits selectively receive light directing signals.

13. The lighting mechanism of claim 10 wherein the receiver unit further includes a rechargeable battery and a battery recharging system electrically coupled thereto.

* * * * *